Jan. 3, 1939.   C. ALEXANDROU   2,142,879
ICE CREAM MACHINE
Filed July 5, 1938   3 Sheets-Sheet 1
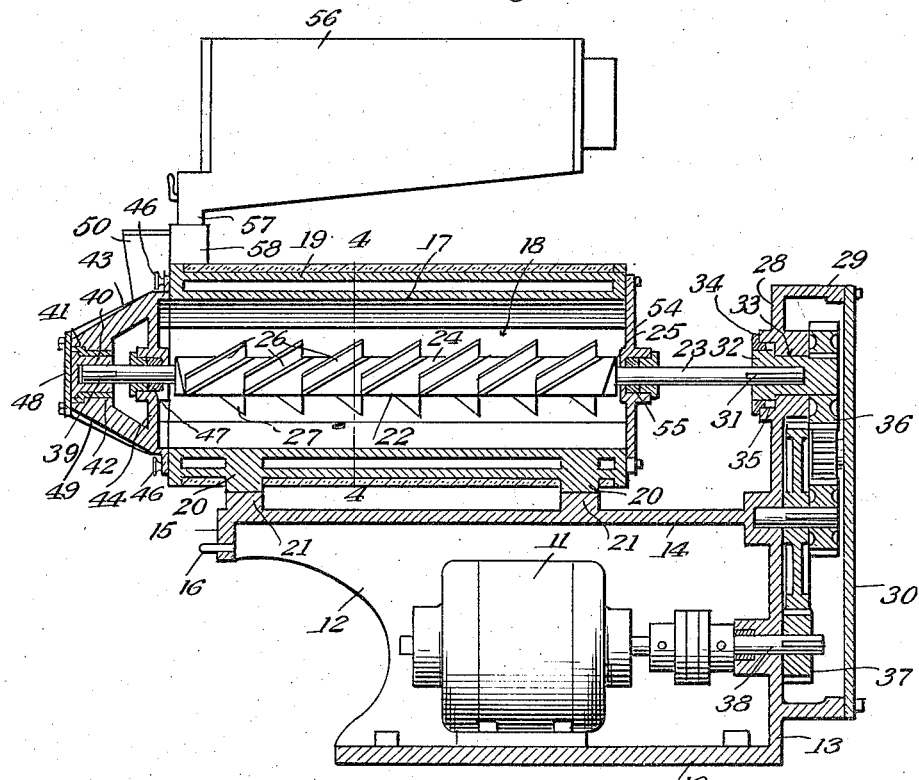
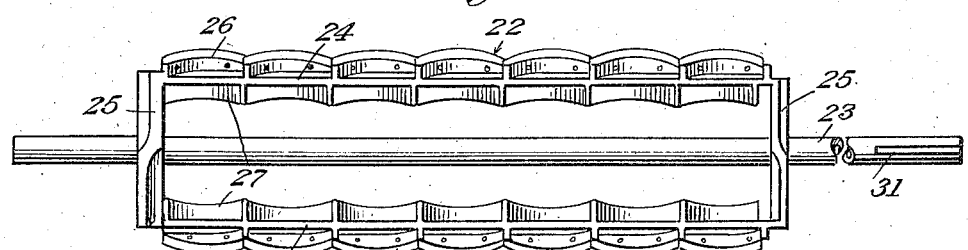
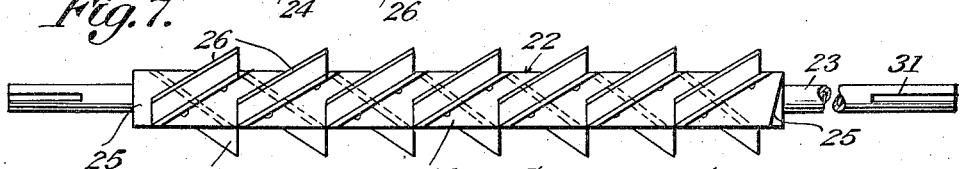
Constantine Alexandrou
INVENTOR
BY Victor J. Evans & Co.
ATTORNEYS Jan. 3, 1939.  C. ALEXANDROU  2,142,879
ICE CREAM MACHINE
Filed July 5, 1938  3 Sheets-Sheet 2

Constantine Alexandrou
INVENTOR

BY Victor J. Evans & Co.
ATTORNEYS

Jan. 3, 1939.  C. ALEXANDROU  2,142,879
ICE CREAM MACHINE
Filed July 5, 1938   3 Sheets-Sheet 3

Constantine Alexandrou
INVENTOR

BY Victor J. Evans & Co.
ATTORNEYS

Patented Jan. 3, 1939

2,142,879

UNITED STATES PATENT OFFICE 2,142,879

ICE CREAM MACHINE

Constantine Alexandrou, Brooklyn, N. Y.

Application July 5, 1938, Serial No. 217,554

1 Claim. (Cl. 259—6)

This invention relates to ice cream machines and has for an object to provide an ice cream freezer which will be so constructed as to be more easily accessible for cleansing than conventional ice cream freezers.

A further object is to provide an ice cream freezer in which the driving gears are isolated from the freezing body of the machine so that no oil may seep into the freezing cylinders.

A further object is to provide an ice cream freezer which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view of an ice cream freezer constructed in accordance with the invention, with parts in elevation.

Figure 6 is a plan view of one of the dashers.

Figure 7 is a side elevation of the dasher shown in Figure 6.

Figure 2:
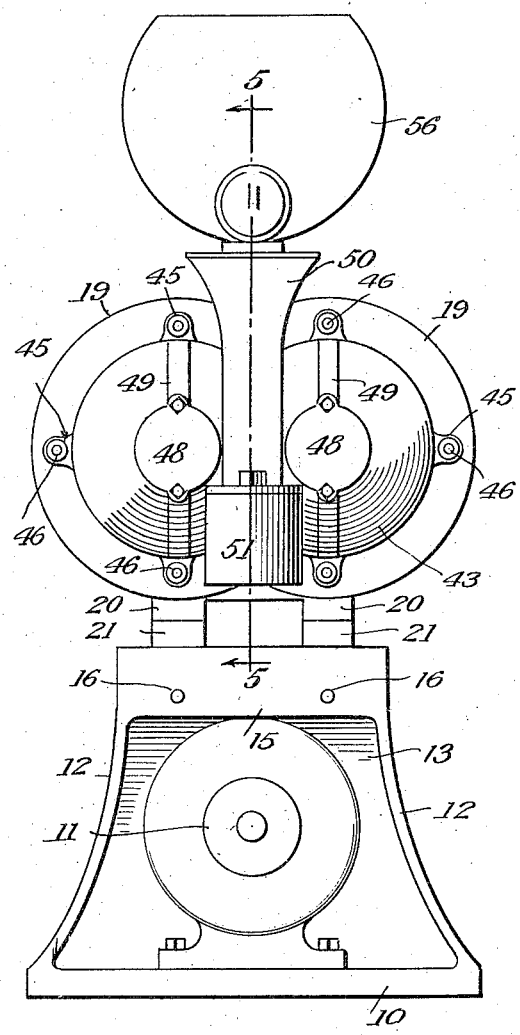
Figure 2 is a front elevation of the ice cream freezer.

Referring now to the drawings in which like characters of reference designate similar parts in the various views, 10 designates a base plate upon which the driving motor 11 is mounted. Side walls 12 rise from the base plate, as best shown in Figure 2, and an end wall 13 also rises from the base plate. A top wall 14 connects the end and side walls and coacts with the walls in forming a housing for the motor which housing is open at the front end to permit the motor being readily accessible for inspection and repairs.

The top wall 14 forms a bed plate upon which the freezing apparatus is mounted and the bed plate is provided at the front end with a depending flange 15 which is equipped with a pair of forwardly extending pins 16, upon which the front head of the freezing chamber may be hung when access to the interior of the chamber is necessary to permit thorough cleansing, inspection and repairs.

The freezing chamber comprises two side by side cylinders 17, the peripheries of which intersect midway between the axes of both cylinders to provide a wide opening 18 between the cylinders so that both cylinders coact in forming a single freezing compartment. The cylinders are provided with respective refrigerant jackets 19 as is customary.

As best shown in Figures 1 and 2 the cylinders are provided at the ends with depending lugs 20 which are secured to upstanding lugs 21 on the bed plate in any preferred manner.

The dashers 22, best shown in Figures 6 and 7, each comprise a shaft 23, frame bars 24 disposed longitudinally of the shaft and spaced therefrom, and end frame bars 25 which are fixed to the shaft and to the longitudinal frame bars 24. The end frame bars 25 are beveled to provide a screw or propeller, the pitch of one bar being opposite to that of the other so that one will tend to feed the ice cream forwardly while the other will tend to feed it rearwardly in the freezing chamber.

Scrapers 26 are bolted to the outer face of each longitudinal frame bar 24. The scrapers are spiral plates and are arranged in a row from end to end of the respective bar. These scrapers have a slight clearance with the inner wall of the respective cylinder so as to scrape ice cream therefrom without touching the metal of the wall.

Vanes 27 are formed integral with the inner face of each longitudinal frame bar and these vanes are arranged in a row longitudinally of the bar and are turned oppositely to the scrapers, as best shown in Figure 7, so that while the scrapers tend to feed the ice cream in one direction the vanes will tend to feed it in the direction opposite thus assuring thorough agitation of the semifluid mass.

The rear wall 13 of the motor housing is continued upwardly past the bed plate 20, as shown at 28. A flange 29 is formed on the rear wall and the extension 28 thereof to provide a gear housing which is closed by a removable cover 30. The gear housing is spaced considerably from the freezing cylinders so that no oil may escape into the cylinders and also for the purpose of permitting easy access for inspection and repairs.

The shaft 23 of each dasher is keyed, as shown at 31, to a respective bearing 32 which is rotatably mounted in a bearing opening 33 formed in the gear housing. A packing 34 is sleeved on the bearing and fits snugly in a recess 35 of larger diameter than the bearing opening, to prevent escape of oil from the gear housing longitudinally of the shaft.

Figure 3:
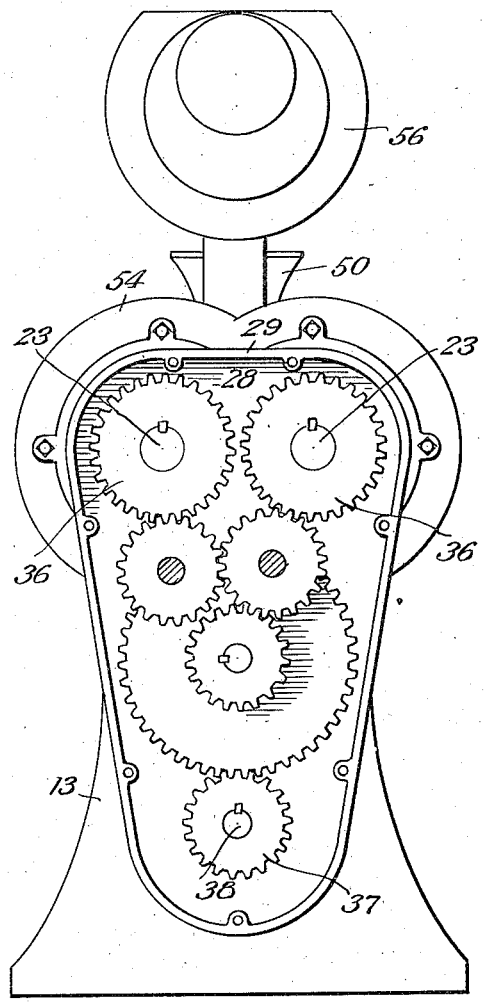
Figure 3 is a rear elevation of the ice cream freezer with the cover of the gear housing removed.
Figure 4:
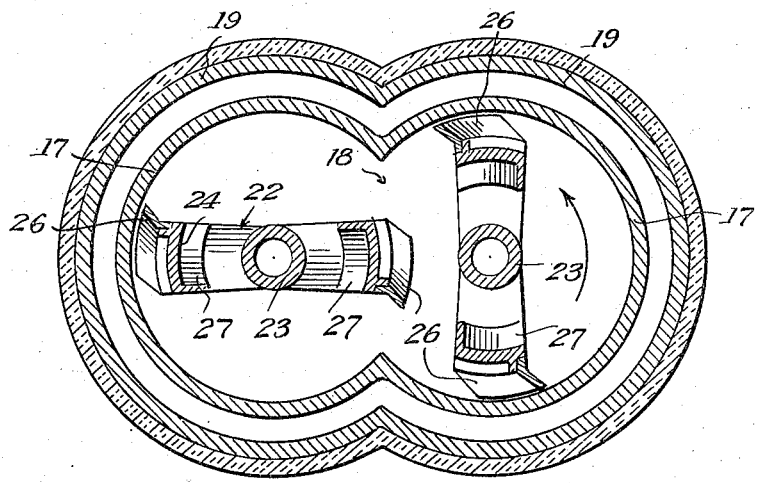
Figure 4 is an enlarged cross sectional view taken on the line 4—4 of Figure 1.

A respective gear train 36, best shown in Figure 3, connects each dasher shaft with a driving gear 37 carried by the shaft 38 of the motor. The gear trains may be of any convenient type to transfer motion of the motor shaft to the dasher shafts at reduced speed. The front end of each dasher shaft is keyed as shown at 39 in Figure 1 to a bearing 40 which is rotatably mounted in a bushing 41 disposed in a bearing opening 42 formed in a shell 43 which is integral with a head 44 which closes the front end of the freezing chamber. The head, as best shown in Figure 2, is formed in one integral piece to close the front ends of both cylinders 17, and is provided at spaced points with perforated lugs 45 which receive securing bolts 46 through the medium of which the head is removably bolted in place. When the bolts are removed the head may be suspended from the beforementioned pins 16 by inserting the pins in the two uppermost perforated securing lugs while the interior of the freezing chamber is being cleansed, inspected or repaired.

A stuffing box 47 for each shaft 23 is formed integral with the head. The shells 43 are closed at the front ends through the medium of cap plates 48 which are bolted to ribs 49 formed integral with the outer face of the head.

Figure 5:
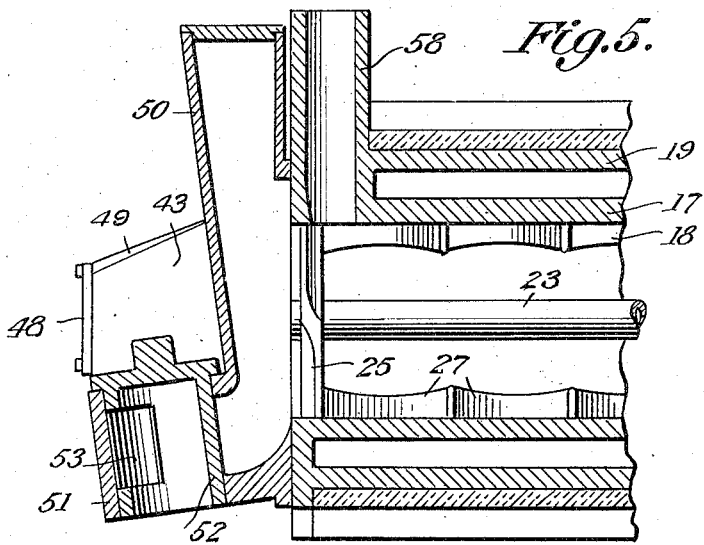
Figure 5 is an enlarged longitudinal sectional view taken on the line 5—5 of Figure 2.

A conventional fruit hopper 50 is mounted on the front head 44 of the machine and communicates with the space 18 between the cylinders 17, as best shown in Figure 5. An outlet spout 51 is formed integral with the lower end of the hopper and is closed by a cylindrical plug valve 52 having a port 53 which may be turned into registration with the lower end of the hopper to permit the semi-solid mass of ice cream to flow from the freezing chamber.

The rear end of the freezing chamber is closed by a head 54 which is similar in shape to the front head 44 and is provided with a stuffing boxes 55 through which the dasher shafts 23 project.

A conventional automatic weighing device 56 is provided with a valve controlled discharge pipe 57 which is inserted in a pipe 58 which is formed integral with the cylinders and which opens into the space 18 between the cylinders adjacent to the hopper 50.

From the above description it will be seen that the cylinders may be readily cleansed by removing the front heads 44 and it will be seen that by virtue of the shells 43 on the front heads and by virtue of the gear housing being spaced considerably from the cylinders, oil cannot gain access to the interior of the cylinders.

What is claimed is:

In an ice cream freezer, the combination with a freezing cylinder, of a dasher comprising a shaft, longitudinal frame bars spaced from the shaft, end bars connected to the shaft and to the frame bars and beveled to provide screw propellers, the bevel of one end bar being opposite to the bevel of the other end bar so that the end bars tend to feed the ice cream oppositely from each other, scrapers on the outer faces of the longitudinal bars, and vanes on the inner faces of the longitudinal bars.

CONSTANTINE ALEXANDROU.